(No Model.)
I. W. HOOVER.
POTATO DIGGING AND GATHERING MACHINE.
No. 415,202. Patented Nov. 19, 1889.
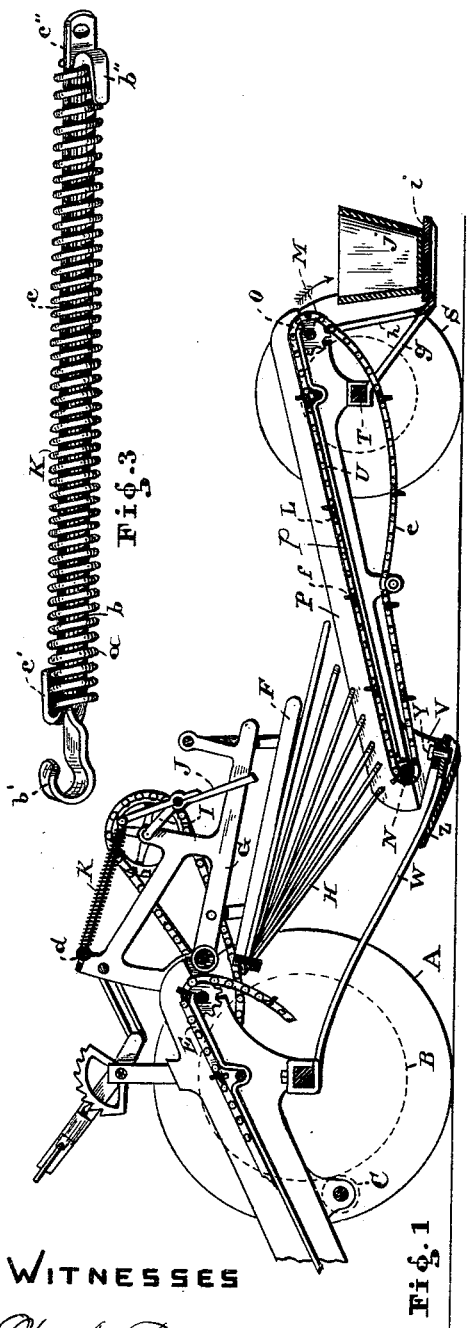
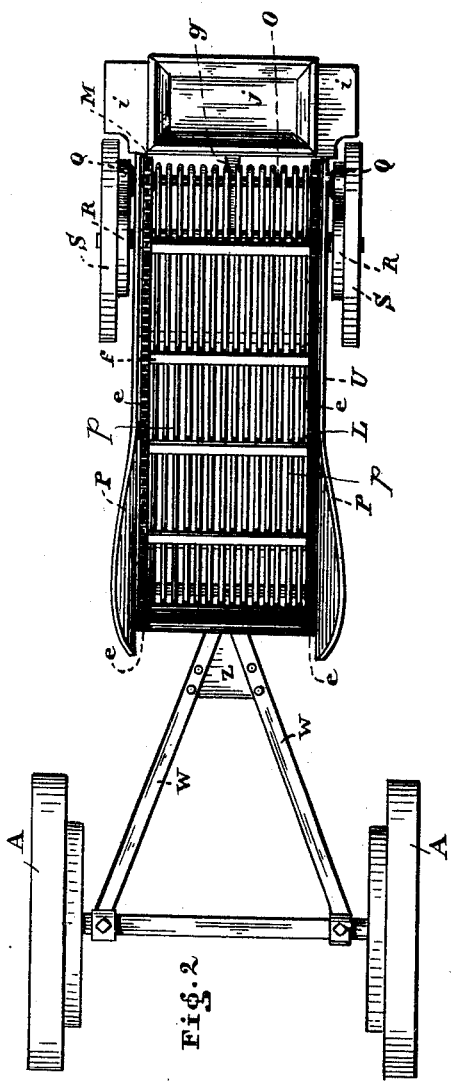
Witnesses
W. A. Biddle
J. W. Mehling
Inventor
I. W. Hoover
W. H. Burridge
Atty.

UNITED STATES PATENT OFFICE.

ISAAC W. HOOVER, OF AVERY, OHIO.

POTATO DIGGING AND GATHERING MACHINE.

SPECIFICATION forming part of Letters Patent No. 415,202, dated November 19, 1889.

Application filed March 2, 1889. Serial No. 301,562. (No model.)

*To all whom it may concern:*

Be it known that I, ISAAC W. HOOVER, a resident of Avery, in the county of Erie and State of Ohio, a citizen of the United States, have invented a certain new and Improved Potato Digging and Gathering Machine; and I do hereby declare the following to be a full, clear, and complete description thereof.

My invention consists of certain mechanisms operating conjointly for the purpose of digging the potatoes and then gathering them into a receptacle at the rear end of the machine, thereby avoiding the labor of picking them up in the usual way, and also at the same time increasing the quantity gathered.

That the invention may be fully understood and seen, reference will be had to the annexed specification and accompanying drawings, in which—

Figure 1 represents a central vertical section of the gathering mechanism as located under the screen and attached to a machine patented to me May 8, 1888, No. 382,363. Said figure also illustrates the tension-links in connection with the raking mechanism of said machine. Fig. 2 is a plan view of said gathering mechanism and parts of the machine to which it is attached. Fig. 3 is an enlarged perspective view of the tension-link detached.

Like letters of reference refer to like parts in the drawings and specification.

The invention, as above stated, is shown in connection with the machine fully shown and described in the patent cited; hence there are herein only those parts of said machine shown as are essential for a thorough knowledge of the application and operative devices of said invention.

A in Fig. 1 represents one of the driving-wheels, and B a gear-wheel, which is secured thereto to rotate the pinion C. A sprocket-wheel (not shown) on the shaft of said pinion imparts, by means of a chain, motion to the elevator E to convey the potatoes up and upon the separator F, which is held suspended from the frame G, as seen in Fig. 1. Arranged underneath said frame is the sifter or screen H, on which the potatoes are conveyed, sifted, and separated from dirt and weeds and delivered to the gathering mechanism, hereinafter fully described.

Journaled on or within an upright arm of the frame G is the crank-shaft I. Said shaft, when set in motion, agitates the rakes, as shown at J, in connection with the link K, which at one end is held secured to an arm of the frame G and at the other with the upper part of the rakes J. The office of said rake or rakes is to assist the separator in freeing the potatoes from the stalks and weeds and to draw the weeds along the separator for a speedy discharge from the machine.

The links as heretofore employed in connection with the rakes were simply connecting-rods, which are liable to break, owing to undue strains which may be encountered when the separator becomes too heavily charged with weeds and stalks, as may occur when the field is encumbered with them. To provide links to endure such strains with comparative safety is one of the objects of this invention. A spring-link, as represented in the enlarged Fig. 3, has been for this purpose constructed to embody the properties essential to the conditions under which it may be used. The link consists of the spiral spring $a$, the rods $b$ and $c$ extending through said spring. The loop $b'$ of the rod $b$ is attached to the upper cross-bar $d$ of the frame G, and the hook $b''$ extends over the end of the spring $a$ to hold said rod within said spring. In like manner, but in an opposite direction, the rod $c$ is connected with said spring $a$—that is, the hook $c'$ laps over the end of the spring $a$ and the eye $c''$ is connected with the rake J. Thus when the link K is exposed to strains which have a tendency to stretch it longitudinally said spring is in action and becomes more or less compressed, lengthening the link, depending upon the resistance encountered in the removal of the stalks and weeds from the potatoes. By this adjustability of the spring-link it is relieved from undue strain, as the compression of the spring $a$ allows of a relative extension of the link-rods inversely, and thus avoids breakage, which would otherwise occur if no provisions were made to allow of an extension of said link or links, as stated.

Another feature of my invention is the gathering devices, the object of which is to collect the potatoes as they leave the screen and to deliver them into a receptacle placed at the rear end of the gatherer or machine.

The advantages of a gatherer when combined with a potato-digger can readily be appreciated when the amount of manual labor and time which would be required to pick up the vegetable is taken into consideration. This gatherer in part consists of an elevator or conveyer mounted upon a truck and operated in connection with the digger mechanism, the connection being such as to extend the front end of the elevator directly under and in line with the screen of the digger. Upon a platform at the rear end of said gatherer is placed a movable receptacle to receive the potatoes from the elevator, which receptacle, when filled, is removed and an empty one set in place thereof while the machine is in motion.

The elevator L consists of the combination of the chains e e and the flanged bars f, connecting at intervals with said chains. The bars f move over the bottom of the inclined supporting-frame, consisting of the bars p, forming an open-work support for the potatoes, allowing dirt to fall through before reaching the receptacle. The chains engage in the sprocket-wheels M at the rear upper end and are guided over the roller N at the front lower end of said elevator, as seen in Fig. 1. The sprocket-wheels are secured to the shaft O, which extends transversely through the side plates P. Outside of these plates P are pinions Q on the same shaft O, which engage in the gear-wheels R of the drivers S. The drivers S revolve loosely upon the axle T; but the side plates P are connected rigidly with said axle, as seen in Fig. 1, to support the rake V, upon which the elevator L slides.

With the front end of the side plates P is secured the brace V, as seen in Figs. 1 and 2. Said brace has a jointed or pivotal connection with the bifurcated draw-bar W by means of the king-bolt Y, as seen in Fig. 1. The shoe Z at the lower end of said drawbar is for the purpose of protecting the pivotal connection of said bar and brace.

With the axle T and the side plates P are attached the brackets g and h for support of the platform i, on which is set the receptacle j, Figs. 1 and 2, receiving the tubers as delivered from the machine. This receptacle extends across the entire width of the elevator L, and is made of a size and form best adapted for removal when filled with potatoes. The potatoes on leaving the screen H are gathered up in the manner described and conveyed into the receptacle, which, when filled, is removed and replaced by an empty one while the digger is drawn along over the field and in operation.

What I claim as my invention, and desire to secure by Letters Patent, is—

1. In combination with a potato-digger, the spring tension-links interposed between the upper ends of the rakes, and a stationary bar of the frame of the elevator arranged to operate conjointly with the rakes and their crank-shaft, substantially in the manner shown, and for the purpose described.

2. In combination with a potato-digger and screening mechanism, tension-links consisting of the spiral spring a and the rods b c, extending and operating inversely through said spring, the rod b attached to the frame of the separator and spring, and the rod c to the upper end of the rake and opposite end of the spring, in the manner substantially as shown, and for the purpose described.

3. In combination with the potato-digger comprising the screen H, the gathering mechanism having its front end beneath the said screen, and a draw-bar W, extending from the digger-frame beneath the screen H and pivotally secured to the front end of the gatherer, substantially as described.

4. The described potato-gatherer mounted upon wheels at its rear part and the front end attached to the potato-digger by a drawbar having a jointed connection with the brace Y of the gatherer, and a protecting-shoe Z, in combination with the sifting-screen H, arranged to extend over the front end of the gatherer, substantially as described, and for the purpose specified.

In testimony whereof I affix my signature in presence of two witnesses.

ISAAC W. HOOVER.

Witnesses:
W. H. BURRIDGE,
B. F. EIBLER.